United States Patent [19]

Mowatt-Larssen

[11] Patent Number: 4,515,189
[45] Date of Patent: May 7, 1985

[54] MOLTEN SULFUR TANK CAR ASSEMBLY

[75] Inventor: Erling Mowatt-Larssen, Warren, Ohio

[73] Assignee: General American Transportation Corporation, Chicago, Ill.

[21] Appl. No.: 512,749

[22] Filed: Jul. 11, 1983

[51] Int. Cl.³ .............................................. B65B 3/04
[52] U.S. Cl. .................................... 141/11; 141/35; 141/82; 141/98; 141/52; 105/358; 105/451; 137/575; 165/169; 222/145; 222/146.2
[58] Field of Search ................................ 141/35, 37–66, 141/98, 231–233, 82, 1–12; 105/358, 360, 451; 137/256, 571, 572, 575; 165/169; 222/145, 146 R, 146 H, 146 HE; 219/200, 202, 522, 201, 523

[56] References Cited

U.S. PATENT DOCUMENTS

| 1,866,544 | 7/1932 | Cleaver | 165/47 |
|---|---|---|---|
| 1,875,609 | 9/1932 | Isaacson | 165/47 |
| 3,091,824 | 6/1963 | Manshel | 141/52 |
| 3,176,764 | 4/1965 | La Barbera | 165/168 |
| 3,228,466 | 1/1966 | Carleton | 165/169 |
| 3,595,307 | 7/1971 | Mowatt-Larssen et al. | 165/47 |
| 3,685,458 | 8/1972 | Price et al. | 105/368 |
| 3,722,556 | 3/1973 | Jeffers et al. | 141/2 |
| 3,897,807 | 8/1975 | Hurst et al. | 141/90 |
| 3,906,995 | 9/1975 | Schmidt | 137/575 |
| 4,002,192 | 1/1977 | Mowatt-Larssen | 141/35 |
| 4,110,602 | 8/1978 | McDade | 219/523 |
| 4,266,580 | 5/1981 | Dixon | 141/35 |

Primary Examiner—Houston S. Bell, Jr.
Attorney, Agent, or Firm—Hill, Van Santen, Steadman & Simpson

[57] ABSTRACT

One or a series of wheeled tank cars for carrying a commodity which must be heated for effective handling and which produces noxious gases when heated is provided with a closed vapor recovery system, including valved lines respectively associated with each tank car, for safely venting said gases to a remote recovery sink away from operating personnel as the commodity is heated in the one or more tank cars prior to unloading or during the filling operation. An upper heating coil system is also disclosed for melting away solidified commodity from upper tank fittings prior to operation of said fittings in the unloading or loading operation for reliable flow handling therethrough and operation of their valves.

20 Claims, 5 Drawing Figures

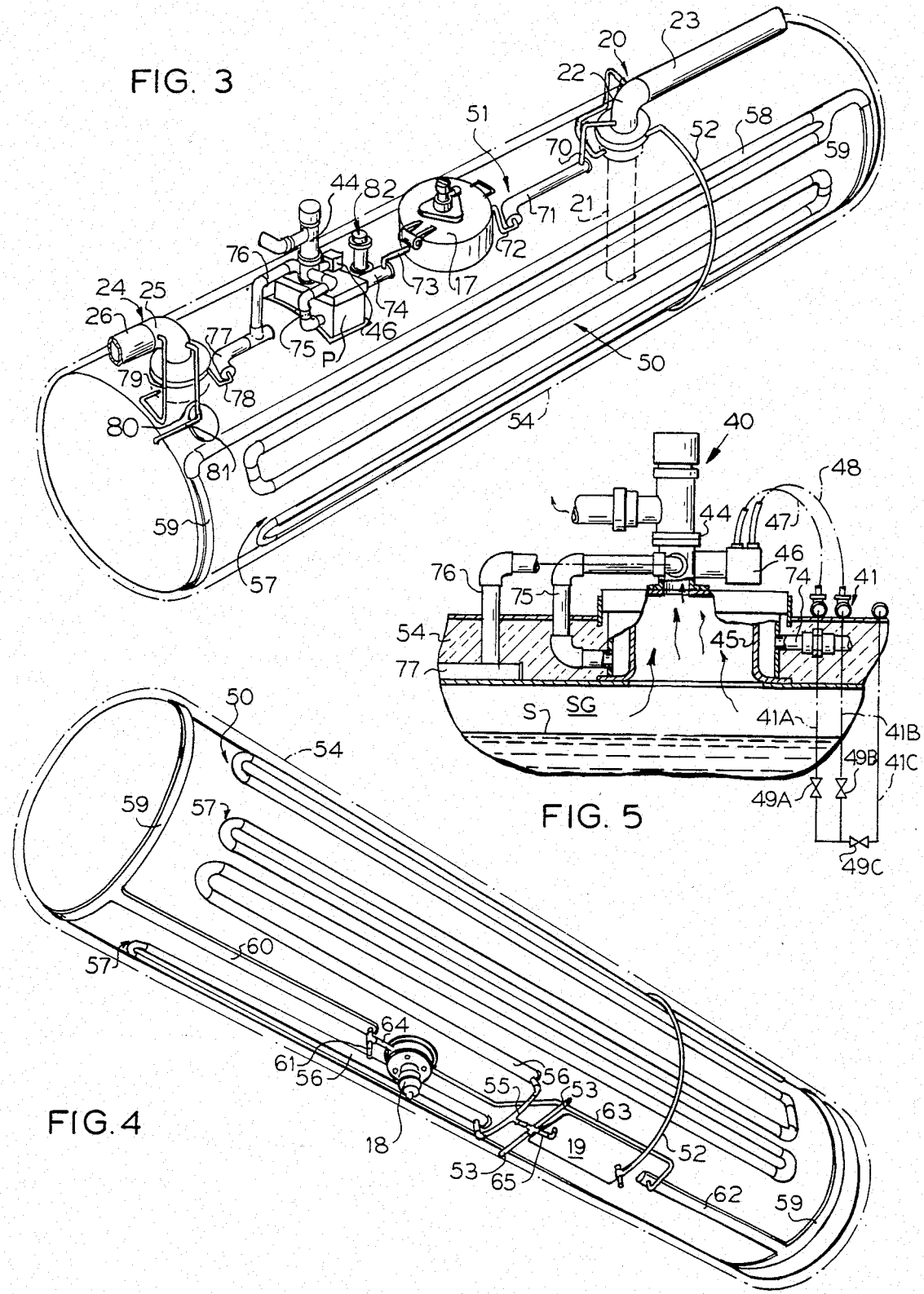

MOLTEN SULFUR TANK CAR ASSEMBLY

BACKGROUND OF THE INVENTION

The invention relates to railway tank cars and, more particularly, to a method and apparatus in which one or a series of tank cars containing lading which must be heated to permit load/unload handling is provided with a unique vapor line system used to vent vapors during the heating of the lading commodity and a unique top heater coil system for use in freeing the fittings of the vapor line and other fittings prior to fill/emptying of the tank car.

Often the storage tanks of railway tank cars are used to transport lading which must be heated at the delivery site to liquify the lading into a state which promotes flowability for affective unloading. Typically, this heating of the storage tank commodity is accomplished by the use of a steam heater coil system extending along and about the bottom portion of the storage tank as disclosed, for example, in U.S. Pat. Nos. 3,897,807 and 3,685,458. In some instances, this form of lading can produce noxious gases or vapors within the storage tank as the result of the heating process, which gases present a health and/or safety hazard at the delivery site if they should be expelled from the storage tank during unloading. A notable example in this regard of such lading is molten sulfur.

Molten sulfur is generally considered a difficult to handle commodity in its molten state. It is classified as a combustible, and generally is kept at 300° F. or less for storage and handling. Molten sulfur has a sharp phase change above 317° F. and can carmalize, i.e. become very viscous. It solidifies at 238° F. and, in its solid state, is very difficult to reheat and remelt. At temperatures of 300° F. or higher, sulfur combines readily with hydrogen to form hydrogen sulfide $H_2S$, a highly poisonous gas. Sequential reaction of sulfur with moist air forms sulfur oxides, which are gases hazardous to health and which can combine with water vapor to form highly corrosive sulfuric acid $H_2SO_4$. During the delivery site heating of a molten sulfur tank car, these noxious gases are typically produced and can present a hazardous condition to operating personnel in the unloading operation if these gases are permitted to be expelled into the atmosphere about the storage tank, either through a gas relief value or the drainage port means associated with the tank car.

It is also known in the art to interconnect a series of railway tank cars through the use of induction and eduction conduits mounted adjacent opposed ends of each tank car for the purpose of sequential, consecutive load/unloading of fluid ladings from a single point at one end of the series of tank cars. This sequential unloading concept facilitates the formation of unit trains and is disclosed, for example, in U.S. Pats. 3,897,807 and 4,002,192. It can occur, however, that these induction and eduction conduits become blocked or obstructed with solidified liquid, such as molten sulfur, as a result of previous use or, more typically, the valve units operable in such conduits become obstructed due to solidified fluid. The presence of such solidified fluid in the valve passages of the tank car induction and eduction conduits requires spot correction in order to permit the unloading or loading sequence to operate, presenting a time consuming problem at the delivery site.

The present invention concerns a method and apparatus for obviating these and other tank car handling problems, thus facilitating the unloading of unit tank trains and safeguarding the working environment from noxious gases at the delivery site.

SUMMARY OF THE INVENTION

The invention relates to a railway tank car, or possibly other forms of wheeled tank car assemblies, used for transporting lading commodities which must be melted by heating for effective unloading and which may produce noxious gases when heated to liquid state. Such tank cars are provided with steam heating coil means adjacent the bottom portion thereof for passing steam or other heating fluid therethrough to melt the lading to permit unloading. In accordance with the invention, a vapor line system is placed in fluid communication with the top of the tank car at one end and with a relatively remote recovery sink, such as a gas scrubber unit, at the other end. A remote controlled valve arrangement is associated with the vapor line system to selectively open the vapor line to the interior of the tank during the heat up of the lading and close the vapor line to the tank interior during the emptying of the lading from the tank. In this way, noxious gases produced during the lading melting can be recovered or safely vented away from the operating personnel at a delivery site before the lading is emptied from the tank. In the case of a unit train unloading arrangement, the vapor line system preferably comprises a series of individual vapor venting lines extending respectively from each tank car to a common flow line extending along the length of the unit train cars and connected at one end of the unit train to the recovery sink.

The invention also concerns a unique heater coil system disposed along the top of each tank car to permit preliminary heating of all top fittings and especially their valve portions prior to the melting of the lading commodity within the tank via the main heating coil means disposed along the bottom of the tank. These heated fittings include the valved flow path of the vapor lines system, as well as valve induction and eduction conduits in the case of a unit train arrangement.

These and other advantages and features of the present invention are more fully disclosed in the detailed description below.

BRIEF DESCRIPTION OF THE DRAWING

FIG. 3 is a perspective elevational view of a single tank car of FIG. 1 illustrating the upper heater coil system of the invention.

FIG. 4 is a perspective elevational view of the tank car of FIG. 3 illustrating the lower portion of the tank.

FIG. 5 is a fragmentary, partially cross-sectional side elevational view of the vapor line means associated with the tank car of FIG. 3.

DESCRIPTION OF THE PREFERRED EMBODIMENT

Figure 1:
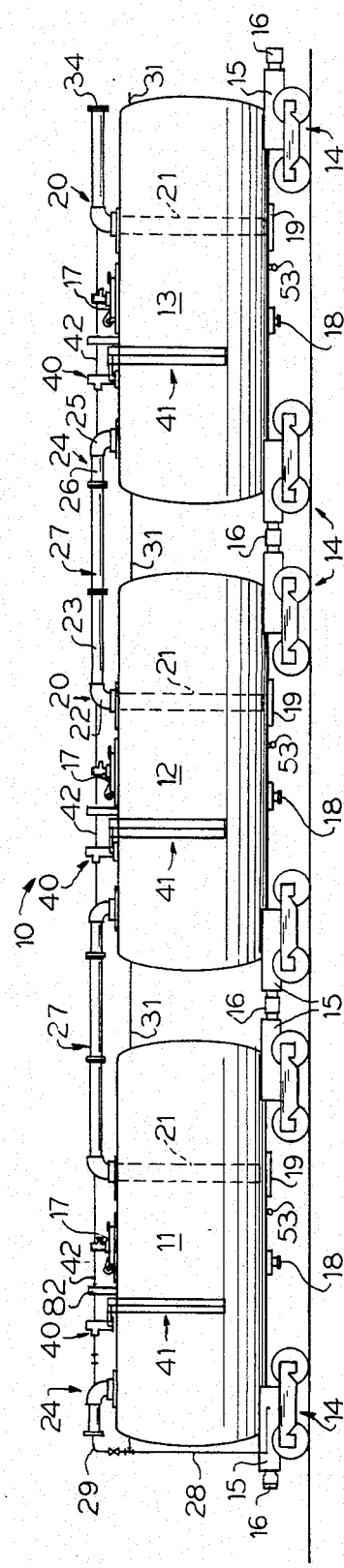
FIG. 1 is a side elevational view of a train of individual tank cars arranged for sequential unloading and constructed in accordance with the invention.
Figure 2:
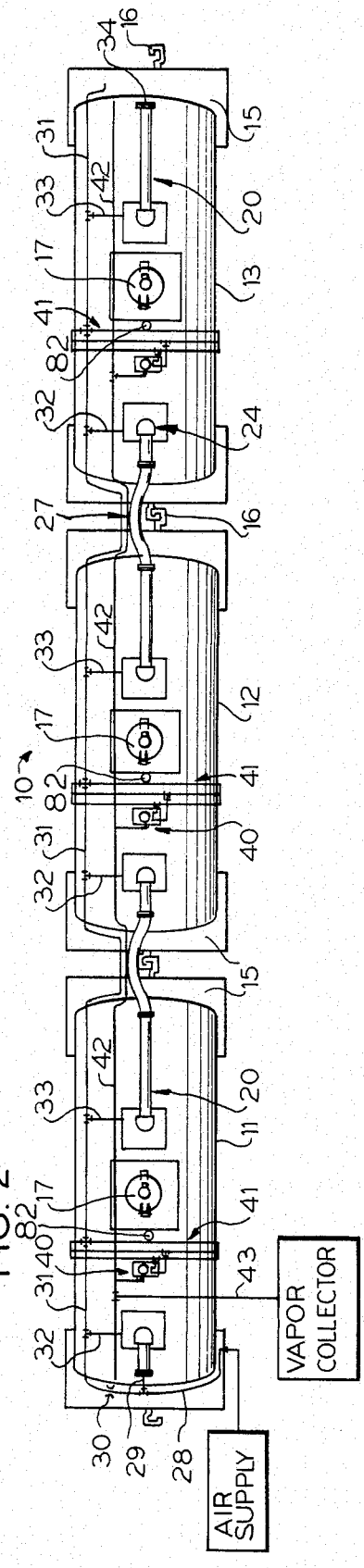
FIG. 2 is a plan elevational view of the train of FIG. 1.

Referring to FIGS. 1 and 2 of the drawings, there is disclosed a train 10 comprised of a series of three railway-type wheeled tank cars 11, 12 and 13, each of which is provided with a pair of spaced-apart truck structures 14 carrying wheels adapted to ride on a standard railway rail. Each of the trucks 14 is also provided with a draft sill 15 and a coupling mechanism 16 at the end of the draft sill. Each tank car includes a generally cylindrical shell closed at each end thereof by dome ends to form a closed lading structure. The top of each tank car is provided with a known manway portal 17 and the bottom of each tank car is provided with a conventional drainage valve unit 18 through which the tank lading may be emptied from the tank car.

In accordance with the preferred embodiment, the series of tank cars 11, 12 and 13 are arranged for sequential unit train load/unloading in a manner such as more fully disclosed in U.S. Pat. No. 3,897,807. Accordingly, disposed along the bottom center line of each tank car adjacent a corresponding first end of the tank is a sump indentation 19. Each tank car is provided with an eduction conduit means 20 adjacent this first corresponding end of the tank. The eduction conduit 20 comprises a vertical pipe 21 which extends downwardly through the top of the tank car to a level short of the sump 19. The upper end of this downwardly extending pipe 21 is connected to a curved pipe 22 extending above the top of the tank car which connects to a longitudinally extending delivery pipe 23 overlying the top of the tank. Disposed on the top of each tank car adjacent the opposed second corresponding end of the tank is provided an induction conduit means 24. The induction conduit 24 comprises a curved pipe section 25 having a lower end extending into communication with the upper portion of the tank interior and an upper end overlying the top of the tank connected with a longitudinally extending inlet pipe 26. The corresponding delivery pipe 23 and inlet pipe 26 of the eduction and induction conduit means, respectively, are interconnected between adjacent tank cars with a flexible connecting conduit 27, each of which conduits 27 are provided with suitable mechanisms at the ends thereof for connecting to mounting flanges at the free ends of the conduits 23 and 26.

In sequential unloading operation, the trail end or A-end tank car 11, that is the tank car having a free end induction conduit 24, is connected through a suitably valved inlet pipe 29 and a feed piping 28, all flexible disconnect pipe, to a source of pressurized motive gas, such as air or inert gas, labelled Air Supply. The pressurized gas feedline 28 is further connected through a suitable restrictor 30 to a pressurized gas flow line 31 running along the length of the train 10 and provided with branch flow lines 32 and 33 at each tank car for the control of butterfly valves (not shown) disposed within the curved pipe portions of the induction and eduction conduit means 24 and 20, respectively. These butterfly valves may be operated pneumatically in a conventional manner to open or close the flow path through the conduit means as desired. Therefore, for unloading, the butterfly valves in the conduit means are pneumatically activated into an open position, whereupon pressurized gas enters into the storage tank of the trail tank car 11 causing the lading therein to be forced upwardly through the eduction conduit means 20 thereof and to pass under pressure into the next adjacent middle tank car 12 through the induction conduit means 24 thereof. The lading now under pressure in the tank car 12 passes through that tank car's eduction conduit 20 into the storage tank of the tank car 13 through the induction conduit 24 thereof, whereupon the lading in this lead or B-end tank car 13 is placed under pressure and forced out through the eduction conduit 20 thereof and through the free outlet 34 of the delivery pipe 23 associated with the lead tank car to a suitable collector (not shown).

Alternatively, the outlet 34 of the delivery pipe 23 associated with the lead tank car 13 may be capped as shown and lading discharge from the tank 13 allowed to precede through the bottom discharge valve means 18 thereof into a collection pit.

The force of the pressurized gas passing in series between the adjacent tank cars of the train 10 causes all the lading contained in the train tank cars to be emptied through the selected discharge port of the B-end tank car 13. When emptying of the tank cars is completed, the butterfly valves in the induction and eduction conduit means are pneumatically activated back to the closed position and the flow of pressurized gas to the feedline 28 is cut-off. The pressurized gas remaining in the tank cars is then suitably vented and the tank cars are then ready to be refilled in the proper manner.

The sequential loading operation takes place with the lading being introduced through the eduction conduit 20 at the B-end car 13 under pressure. The free end of the induction conduit at the A-end car 11 is vented to atmosphere or a gas recovery unit; and the butterfly valves in the induction and eduction conduits of the tank car series are opened. In this manner lading is sequentially introduced into all of the interconnected tank cars in a reverse flow direction from the unloading operation.

The lading contained in each of the tank cars may be of a type, such as molten sulfur, which must be melted by heating to a liquid state for proper flowability in the unloading sequence and which produces noxious gases when heated in this manner. To prevent these noxious gases from presenting a health or safety hazard to the operating personnel and operating environment at the train unloading site, there is associated with each tank car a closed vapor line system by which the noxious gases produced during the heating of the lading can be recovered or safely vented away from the immediate environment of the unloading site.

With reference to FIGS. 2 and 5, this vapor line system comprises a valved vent pipe structure 40 disposed upstanding from the top of each tank car and extending in fluid communication with the interior of the corresponding tank. The valved vent pipes 40 are each individually arranged for remote control activation by virtue of individual, remote control means 41 correspondingly associated with each individual tank car. For purposes of illustration, the control means 41 are in the form of a pneumatic arrangement including piping in fluid connection with the pressurized gas supply line 31 running along the length of train 10. Each of the valved vent pipes 40 are individually arranged in fluid connection with a common vapor recovery line 42 running along the length of the train 10 and connected at a suitable point through a disconnect line 43 to a relatively remote recovery sink labelled Vapor Collector. The Vapor Collector may be in the form of a stack for venting the collected gases safely to atmosphere or in the form of a gas scrubber for detoxifying the collected gases prior to expulsion into the atmosphere.

Each valved vent pipe 40 comprises a suitably valved flow passage 44 upstanding from the top of the tank car and communicating at its lower end with the interior storage of the tank through a nozzle portal 45 formed in the tank wall. The valve in the passage 44 (which may be a conventional ball valve) is placed in an open or closed position by a suitable control motor 46, which for description purposes here may be in the form of a double acting pneumatic piston motor. The pneumatic control means 41 for activating the valve in the passage 44 may comprise three parallel and interconnected pipe lines 41A, 41B, and 41C. The pipe line 41C serves to connect the remaining pipe lines with the pressurized gas supply line 31. The pipe line 41A communicates with a distributor line 47 for pressurizing one side of the piston motor 46 and the pipe line 41B is similarly connected to a further distributor line 48 for pressurizing the opposed side of the piston motor 46. The piston motor 46 is thus operated in the well-known manner between open and close valve positions depending upon which of the distributor lines is conducting pressure flow. Each of the pipe lines 41A, 41B, and 41C is provided with an individual, respective control valve 49A, 49B, 49C, which may be a manually operable valve device preferably positioned at a point along the height of the tank car for ready access from the ground.

Each of the train tank cars is provided with a main heating coil system 50 disposed about the bottom portion of the tank in the known manner as shown in FIGS. 3 and 4. However, in accordance with the invention, a unique upper coil heater system 51 is also provided on each tank car, communicating with the inlet portion of the main heating coil means 50 via a connecting feedline 52 extending upwardly from the bottom of the tank.

The main heating coil means 50 is preferably of a type more fully described in U.S. Pat. No. 3,685,458. This heating coil system is typically adapted to circulate steam heating fluid along the bottom of the tank to heat the lading contained therein to facilitate unloading. The heating assembly 50 includes an input tee 53 disposed adjacent to the lading drain valve unit 18 and extending exposed beneath an insulation wall 54 surrounding the storage tank shell in which the remaining portions of the heating system are mounted. In operation of the main heating assembly 50, heating fluid is introduced through the input tee 53 and passed to an input manifold 55 connected to relatively straight intake sections 56 disposed on opposed sides of the bottom center line of the tank and leading to corresponding serpentine coil units 57 extending upwardly back and forth along the bottom opposed sides of the tank. Each of the serpentine coil units 57 feeds into an uppermost line 58 extending horizontally substantially the full length of the tank and which is open at opposed ends for passing heating fluid into circumferentially downwardly extending end lines 59 disposed adjacent and along the dome ends of the tank. The circumferential lines 59 feed into bottom heating sections 60 and 62, extending inwardly along the bottom center line of the tank from opposed ends of the tank. The bottom section 62 connects to a pipe 63 which conducts heating fluid through a manifold chamber surrounding the drainage valve unit 18 and out through a connecting pipe 64 communicating with the outlet pipe 61 which the bottom section 60 is directly connected.

The upper heater coil system 51 is adapted to receive heating fluid therethrough prior to the activation of the main coil system 50. Accordingly, when heating fluid, such as steam, is first introduced into the inlet pipe 53, a suitable valve device (not shown) is provided for directing the steam initially only to a connecting flow pipe 65 which passes the heating fluid through a manifold section of the sump 19 and into the feedline 52. The feedline 52 conveys the heating fluid through suitable manifolding associated with the valve flow passage portion of the eduction pipe means 20 in order to melt away any solidified liquid which could obstruct operation of the eduction conduit valve. An elongated exterior pipe serves to conduct the heating fluid from manifolding associated with the valved passage area of the eduction conduit 20 to manifolding associated with the curved pipe portion 22. A flow pipe 70 serves to convey the heating fluid from the eduction conduit to a heat pipe 71 disposed along the top of the tank from which the heating fluid is passed through a pipe 22 into suitable heating manifolding about the manway 17. From the manway, the heating fluid passes through pipe 73 into a further heating section 74 disposed along the top of the tank which delivers the heating fluid to the valved vent pipe unit 40.

As shown in FIG. 5, the heating fluid initially passes through manifolding surrounding the nozzle portal 45 and is then conveyed via pipe 75 into manifolding adjacent the vent pipe valve area of the pipe 44 to assure free operation of that valve. The heating fluid is conveyed by pipe 76 from the valve to vent unit 40 into a further heating section 77 from which the heating fluid passes through line 78 into suitable manifolding about the valved passage area of the induction conduit means 24. A further pipe 79 serves to conduct the heating fluid to further manifolding associated with the induction conduit 24 and then spent heating fluid is passed from the induction conduit means 24 into pipe 80 connected to a condensate return conduit 81, which may extend over the adjacent dome end of the tank down to a free exit at the bottom of the tank.

A conventional pressure relief valve device 82 is provided on the top of the tank in communication with the storage inferior to prevent excessive pressure build-up in the tank, such as in excess of 75 psig. The tank car may also have other suitable equipment of a conventional nature associated therewith, such as a liquid level probe device disposed on the pivotable lid of the manway 17.

The upper heater coil system 51 may be readily constructed in manners other than as shown then to extend heating to all appropriate fittings, nozzles, valve areas, etc. along the top of the tank car so that the presence of solidified sulfur is prevented from interfering with their use or operation.

For unloading of the tank car series, the B-end car 13 is positioned at the unloading station with its drainage unit, for example 18, in communication with a collection pit. The motive gas source Air Supply is connected to the flow line 31 and the suitably valved inlet piping 29 at the A-end tank car 11 with the disconnect line 28. The vapor recovery line 42 is connected to the Vapor Collector at the A-end tank by hook-up of the disconnect line 43. The sulfur commodity in the tank cars must be heated to a proper liquid state for unloading. In accordance with the invention, steam fittings are connected to each of the tank car input tees 53 and steam is directed initially only through the upper heater coil system 51 of each tank car for melting away any solidified sulfur from the nozzles, fittings, and valve areas therealong at the top of the tank to insure that these flow passages are open for venting noxious vapors into the vapor recovery line system and to permit subsequent ready handling of remelted sulfur at temperatures between 250° and 300° F.

The valves in each of the tank car vent pipe assemblies 40 are then opened such that noxious gases or vapors SG arising from the heat-up of the sulfur commodity S, as shown in FIG. 5, are safely vented from each car through the vapor recovery line 42 to the single, remote recovery system away from the unloading operation environment. These vapor recovery system valves are pneumatically opened (via appropriate communication between the pressure gas flow line 31 and the vent pipe control motors 46) preferably in remote fashion from ground elevation by operating personnel.

After a suitable time for remelt heating of the tank car top fittings, such as approximately 2–3 hours, steam from the input tees 53 is then also allowed to be conducted into the input manifolds 55 for passage through the coils of the main heating coil means 50, as well as continued activation of the upper heater coil system 51, for full remelting of each tank's sulfur commodity. Temperature of the sulfur lading is monitored separately for each tank at a port from ground elevation. These ports may be located near the bottom of the A-end car 11, on the sides of the middle car 12, and near the top of the B-end car 13 to indicate handling readiness for the sequential unloading operation. The vapor recovery system continues to operate during this remelting of the tank car commodities.

When temperature ports for the tank cars indicate temperatures of about 290°–300° F., the valves in the vapor recovery system vent pipes 40 are closed (via appropriate remote control actuation of the control motors 46). This permits the cars to be pressurized for the unloading sequence.

The butterfly valves in the appropriate induction and eduction conduits 24 and 20 are now opened (via appropriate control communication with the pressure gas flow line 31) so that the tank cars are no longer isolated from one another. Alternatively, these butterfly valves in the eduction and induction conduits 20 and 24 may also be open during the heating and remelting of the tank commodity. The valved inlet piping 29 is opened so that pressurized motive gas can be introduced into the induction conduit 24 of the A-end car for sequential passage through the cars of the string forcing the melted sulfur ahead of it such that the sulfur commodity empties from the cars through the single discharge port means at the B-end car. Steam heating through the heating coil assemblies 50 and 51 of each car is preferably maintained until all of the cars are fully unloaded.

After the sulfur is unloaded, the vapor recovery line system and the motive gas supply lines are disconnected from the A-end car 11. Suitable venting valves are opened to depressurize the residual motive gas in the tank cars, such as venting through the open end of the inlet piping 28, drain 18, etc. The steam hook-ups are disconnected, allowing the steam and condensate in the heating coils of each car to be emptied.

In the case of sequential loading of the tank car series, if the cars are steam heated prior to and during loading, steam is preferably directed to both the upper heater coil systems 51 and the main heater coil means 50 simultaneously from the start. During loading, the vapor recovery system may also be used to permit safe, remote removal of noxious gases or vapors by connecting the Vapor Recovery unit through the disconnect line 43 to the vapor recovery line 42 and opening the valve of the vent pipe 40 only in the A-end car 11 or, alternatively, connecting the Vapor Recovery to the open end of the inlet piping 28 on the induction conduit of the A-end car and opening the appropriate valves in this passageway. The sulfur in its liquid state is pumped through the cars and valve-opened eduction and induction conduits beginning from the eduction conduit 20 and the B-end car 13, hooked up to a suitable disconnect commodity line, sequentially through to the A-end car 11. Upon loading of the series of tank cars, the vapor recovery system is disconnected from the A-end car. The butterfly valves in the induction and eduction conduits are closed to isolate the tank cars from one another, and the pressurized gas lines and the steam hook-ups are disconnected.

Although various minor modifications may be suggested by those versed in the art, it should be understood that I wish to embody within the scope of the patent warranted hereon all such modifications as reasonably and properly come within the scope of my contribution to the art.

I claim as my invention:

1. A wheeled tank car for transporting lading which is heated for effective handling and which produces noxious gases when heated comprising a tank for containing said lading, inlet and outlet port means on said tank for correspondingly loading and unloading said lading, means for heating said lading to facilitate handling into or from said tank, a vapor line means in fluid communication with the top of said tank and with a relatively remote vapor recovery sink, and a valve means associated with said vapor line means to selectively open said vapor line means to said tank during filling and heat up of said lading and close said vapor line to said tank during emptying and transport of said lading.

2. The tank car of claim 1, wherein said means for heating includes a coil means for passing a heating fluid therethrough and said valve means closes said vapor line means to said tank when said coil means causes said lading to reach a predetermined temperature in said tank.

3. The tank car of claim 1, wherein said tank is disposed on a pair of truck structures carrying wheels adapted to ride on a standard railway rail as part of a train.

4. The tank car of claim 3, wherein said recovery sink is separate from said train.

5. The tank car of claim 1, wherein said valve means are controlled by remote activation.

6. The tank car of claim 2, wherein said vapor line means includes a vent pipe communicating with the interior of said tank and containing a valved flow path and further comprising a heat line, including manifold means adjacent said valved flow path, communicating between different portions of said coil means.

7. The tank car of claim 1, wherein said recovery sink is a gas scrubber system.

8. The tank car of claim 1, wherein said tank is interconnected by coupling means with at least one other similar such tank, said vapor line means extends in fluid connection with other such vapor line means associated with each said other such tank, and each said other such tank has other such means for heating and valve means which are individually operated for that such tank.

9. For a tank car system in which a series of wheeled tank cars are removably connected with one another and each tank car includes a lading storage tank having an induction conduit and eduction conduit communicating with said storage tank interior and extending upwardly adjacent opposed ends of said storage tank, each said induction and eduction conduit containing a valved flow path adjacent the top of said respective storage tank and engageable in fluid communication via connector means with the other of such conduits extending upwardly from the adjacent end of the storage tank of an adjoining such tank car such that lading may be consecutively pumped through said series of tank cars through said conduits and connector means and in which each tank car includes a heating coil means disposed along the bottom portion of said storage tank, an improved tank car comprising:

a heat line, on said storage tank of said tank car including manifold means adjacent said valved flow path of said induction and eduction conduits, communicating between different portions of said tank car's heating coil means and extending substantially along the top of said storage tank.

10. The improvement of claim 9, further comprising a vapor line means in fluid communication through the top of said storage tank with said storage tank interior and with a relatively remote recovery sink and a valve means associated with said vapor line means to selectively open said vapor line means to said storage tank during operation of said heating coil means and close said vapor line means to said storage tank during pumping of said lading, said vapor line means including a valved flow pipe disposed on the top of said storage tank, and said heat line having a further manifold means adjacent said valved flow pipe.

11. The improvement of claim 10, wherein said vapor line means extends in fluid connection with other such vapor line means associated with other such tank cars and said other such tank cars have similar valve means, heating lines, and heating coil means which are individually operated for that such tank car storage tank.

12. The improvement of claim 10, wherein said heat line includes means for isolating said heat line from said heating coil means such that said heat line can be activated prior to activation of said heating coil means.

13. The improvement of claim 9, 10, 11, or 12, wherein said tank car is disposed on a pair of truck structures carrying wheels adapted to ride on a standard railway rail.

14. A method for unloading lading from a wheeled tank car, said lading being of a type which is melted by heating for effective unloading and which produces noxious gases when heated, and said tank car having a storage tank for containing said lading, discharge port means on said storage tank through which said lading is emptied from said storage tank, and heating soil means on said storage tank for passing a heating fluid therethrough to melt said lading to facilitate emptying, comprising the steps of:

providing a vapor line means in fluid communication with said storage tank and a relatively remote recovery sink, passing heating fluid through said heating coil means to melt said lading, opening said vapor line means to said storage tank during the melting of said lading such that noxious gases produced during said melting are vented from said storage tank to said recovery sink, and closing said vapor line means to said storage tank during the emptying of said lading from said storage tank.

15. The method of claim 14, further comprising:
closing said vapor line means to said storage tank after said lading reaches a predetermined temperature indicating said lading is melted 16. The method of claim 15, further comprising: providing a valved flow pipe in said vapor line means adjacent said storage tank and
heating said valved flow pipe prior to passing heating fluid through said heating coil means 17. The method of claim 15 further comprising:
interconnecting said tank car by coupling means with at least one other similar such tank car,
providing said other such tank car with similar such vapor line means,
interconnecting said vapor line means of said tank cars in fluid series,
passing heating fluid through said heating coil means of said other such tank car to melt its lading, and
individually and respectively opening and closing said vapor line means to the storage tank of said other such tank car in accordance with the above process.

18. A method for sequentially unloading lading from a series of wheeled tank cars in which each tank car includes a lading storage tank having an induction and eduction conduit communicating with said storage tank interior and engageable in fluid communication via connector means with the other of such conduits on the nearest adjacent storage tank of an adjoining tank car such that lading may be consecutively pumped through said series of tank cars and in which each tank car includes a heating coil means to heat its storage tank lading to facilitate such pumping, comprising the steps of:

providing a vapor line means in communication with each storage tank of said series of tank cars and with a common relatively remote recovery sink,
passing heating fluid through said heating coil means of each storage tank to heat its lading,
opening said vapor line means to each storage tank during the respective heating of its lading such that noxious gases produced during such heating are vented from said respective storage tank to said recovery sink,
respectively closing said vapor line means to each storage tank after the lading in said respective storage tank reaches a predetermined temperature suitable for pumping, and
pumping said lading through said series of tank cars after all of said valve line means have been closed.

19. The method of claim 18, further comprising:
extending a common gas vent line from said recovery sink along each of said series of tank cars and
connecting the vapor line means of each storage tank between the respective storage tank and said common gas vent line.

20. The method of claim 18, further comprising:
individually, remotely activating the opening and closing of the vapor line means of each storage tank.

* * * * *